S. H. HARRINGTON.
SEMAPHORE SIGNAL.
APPLICATION FILED SEPT. 9, 1903.
924,987.
Patented June 15, 1909.
5 SHEETS—SHEET 1.
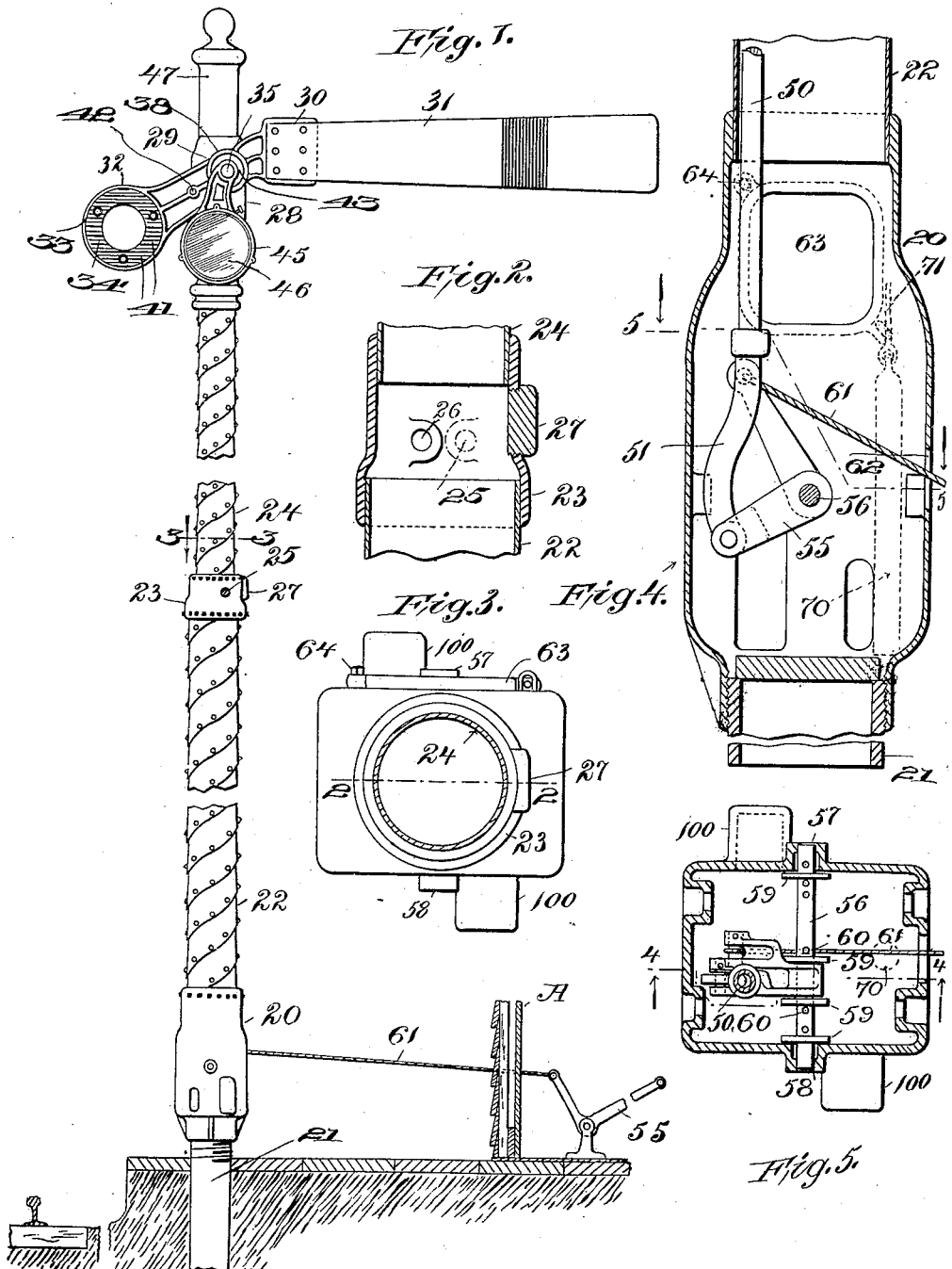

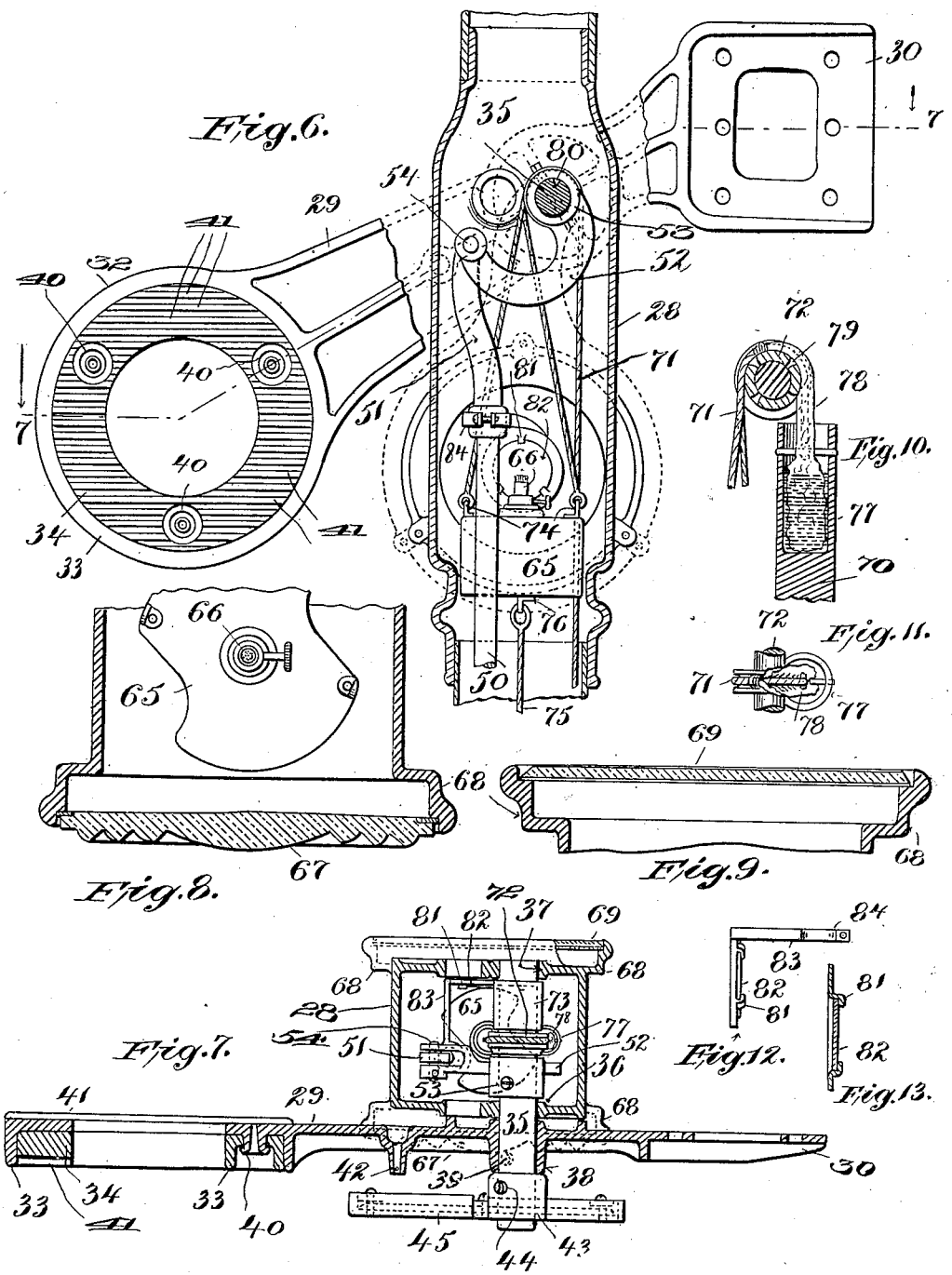

S. H. HARRINGTON.
SEMAPHORE SIGNAL.
APPLICATION FILED SEPT. 9, 1903.
924,987.
Patented June 15, 1909.
5 SHEETS—SHEET 3.
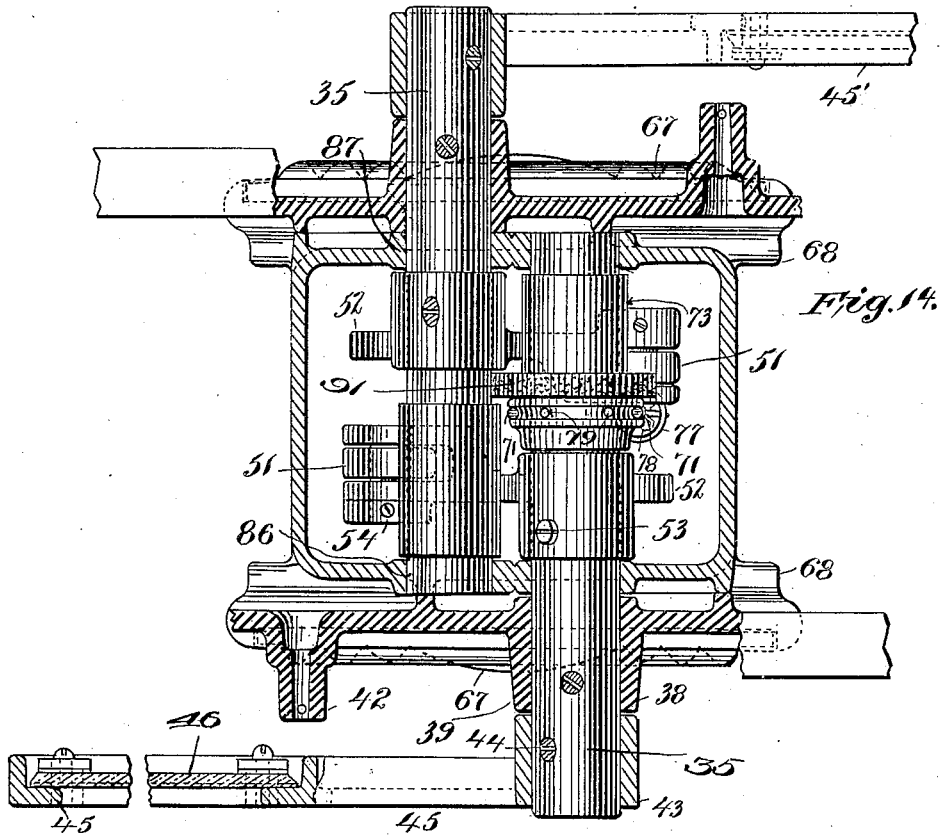
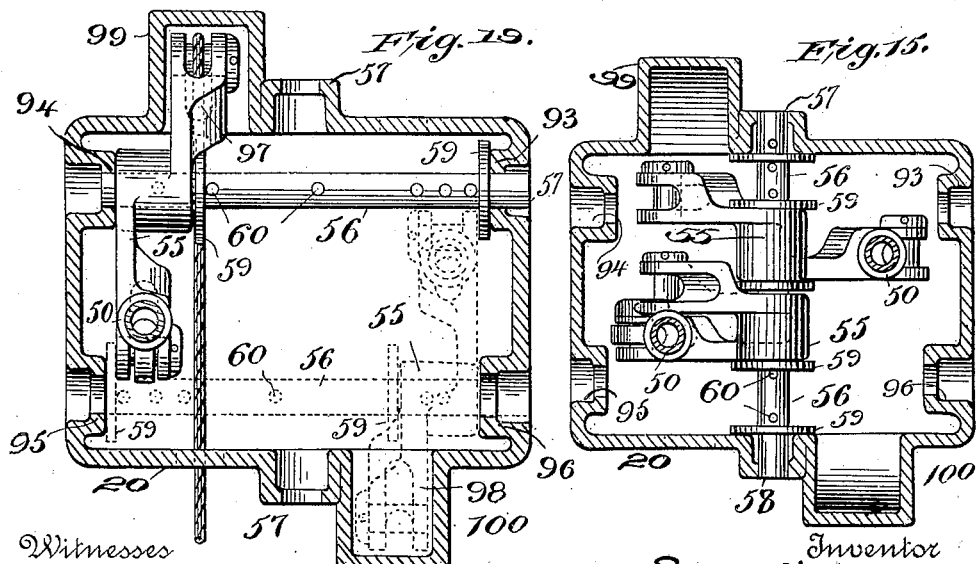
Witnesses
C. W. Benjamin
Allan Foose
Inventor
Samuel H. Harrington
By his Attorneys

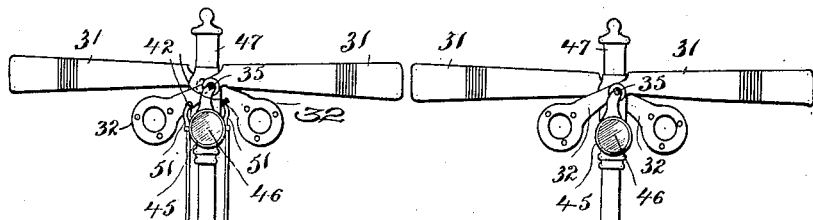
S. H. HARRINGTON.
SEMAPHORE SIGNAL.
APPLICATION FILED SEPT. 9, 1903.
924,987.
Patented June 15, 1909.
5 SHEETS—SHEET 4.
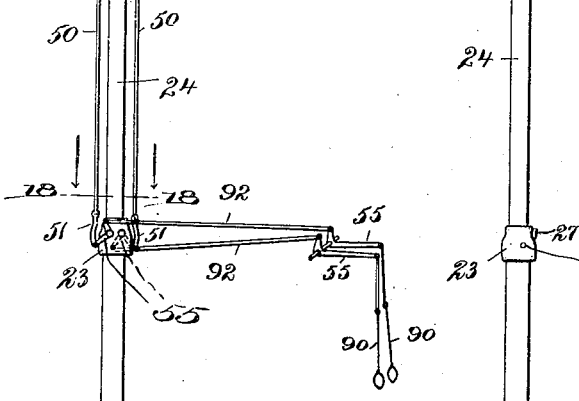
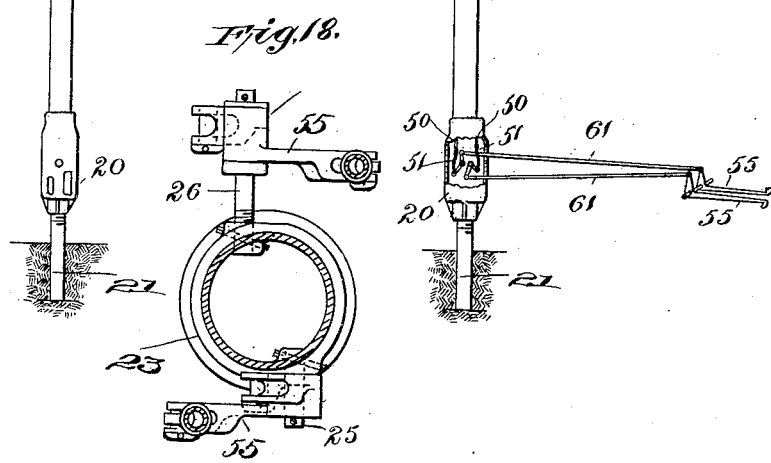

S. H. HARRINGTON.
SEMAPHORE SIGNAL.
APPLICATION FILED SEPT. 9, 1903.
924,987.
Patented June 15, 1909.
5 SHEETS—SHEET 5.
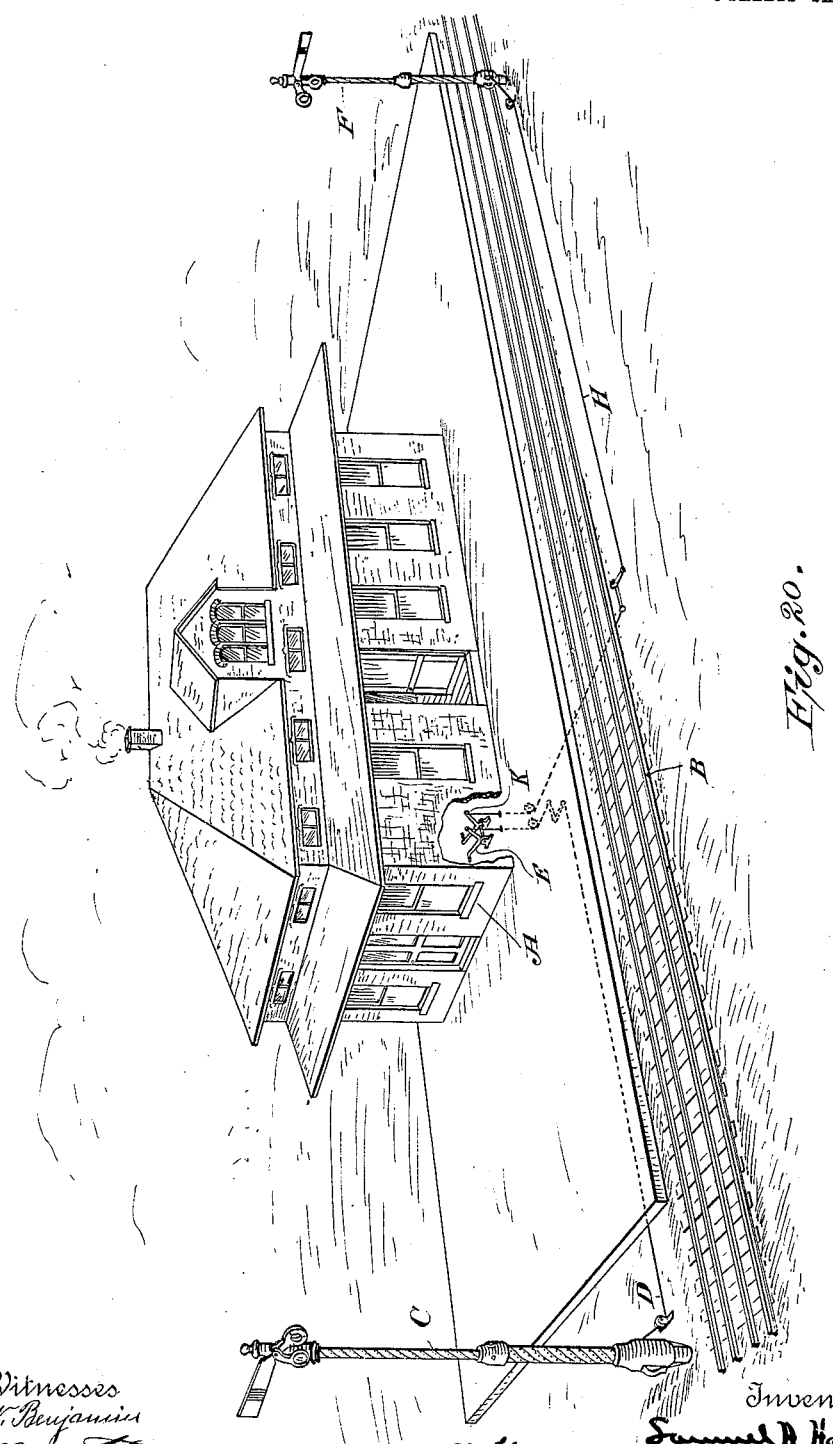

UNITED STATES PATENT OFFICE.

SAMUEL H. HARRINGTON, OF NEW YORK, N. Y., ASSIGNOR TO WILLIAM C. WILSON, OF NYACK, NEW YORK.

SEMAPHORE-SIGNAL.

No. 924,987.        Specification of Letters Patent.        Patented June 15, 1909.

Application filed September 9, 1903. Serial No. 172,426.

*To all whom it may concern:*

Be it known that I, SAMUEL H. HARRINGTON, residing at New York, in the county of New York and State of New York, have invented certain new and useful Improvements in Semaphore-Signals, of which the following is a full, clear, and exact description, such as will enable others skilled in the art to which it appertains to make and use the same.

This invention relates to railway signals, and more especially to the class known as semaphore signals. Its object, in general, is to improve the construction of the semaphore arm and auxiliary parts used in connection therewith, to provide an efficient and economical means for supporting and actuating the semaphore arm, and especially to provide a construction which may be readily adapted for use as a double blade signal, a single blade signal placed in front or in either direction at the side of the operating station, or for home, distant or interlocking signals.

Further objects and advantages will appear hereinafter.

The invention consists in the features of construction, combinations of elements and arrangement of parts which will be hereinafter fully described and the novel features thereof pointed out in the claims.

In the accompanying drawings, Figure 1 is a side elevation of a semaphore post constructed in accordance with my invention, with a single arm mounted thereon. Fig. 2 is a vertical section on line 2—2 of Fig. 3, showing a detail of the construction of the post. Fig. 3 is a transverse section on line 3—3 of Fig. 1, looking in the direction of the arrow. Fig. 4 is a vertical section through the base of the post, showing certain details of the mechanism inclosed therein. Fig. 5 is a section on line 5—5 of Fig. 4, the section on which Fig. 4 is taken being shown by the lines 4—4 of Fig. 5. Fig. 6 is a vertical section through the top housing or casing which supports the semaphore arm, showing certain details of the semaphore, the back-light and the actuating connections, together with the manner of mounting a signal light within the casing. Fig. 7 is a transverse section on line 7—7 of Fig. 6. Figs. 8-13 inclusive are details of various parts of the construction shown assembled in Figs. 6 and 7. Fig. 14 is a transverse section similar to that of Fig. 7, but showing the parts as arranged for a double blade signal. Fig. 15 is a view similar to Fig. 5, showing the actuating devices in the base as arranged for a double blade signal corresponding to the showing of Fig. 14. Fig. 16 is a view similar to Fig. 1 but showing a double blade signal arrangement and with a section of the base broken away to show the position of the parts within, this position corresponding to the showing of Fig. 15. Fig. 17 is a view similar to Fig. 16 of a double blade signal with the actuating connections outside the post. Fig. 18 is a section on line 18—18 of Fig. 17, looking in the direction of the arrow. Fig. 19 is a view similar to Fig. 15, showing the method of arranging the parts for use as a single blade signal at the right or left of the operating point. Fig. 20 is a perspective of a station with semaphores at the right and left thereof, illustrating the interchangeability of the signal and the conditions under which such interchangeability is desirable, as a supplement to the illustration of Fig. 19.

Similar reference characters refer to similar parts throughout the several views.

As best shown in Fig. 1, the semaphore post comprises a base 20 in the shape of a hollow casing, preferably of malleable iron, supported by a ground pipe 21 of any suitable material, preferably of heavy wrought metal. It may here be noted that the screw connection clearly shown in Fig. 1 between these parts permits the entire post with its associated parts to be rotated about its axis if desired. The value of this movement in changing the positions of the signal arms will be obvious.

Riveted in the upper end of the base 20 is a pipe section 22, formed preferably of spirally riveted pipe, as shown. The use of pipe or tubing of this material in the construction of the post increases the strength while at the same time it reduces the weight and adds to the convenience of assembling and installing. There may be a number of pipe sections of this character, but it is preferred that there be two, as shown, connected by a coupling or section 23 of a similar light metal, preferably malleable iron, to which the lower section 22 and the upper section 24 of the piping forming the post proper are riveted. The coupling 23 is provided with lugs or studs 25, 26 projecting from opposite sides thereof, the purpose of which will hereinafter be apparent; and it is desirable that there should also be a handhole therethrough which may be closed by a cap, as at 27, in order that suitable tools may be inserted for riveting the pipe sections to the coupling in assembling. Carried above the upper pipe section 24 and preferably riveted thereto, as shown, is a housing or casing 28 which forms a continuation of the post and provides a support for the semaphore arm, the main frame of which is shown at 29, as of webbed metal. One end of the semaphore frame is provided with a socket 30 for the reception of the usual semaphore blade 31, and the other end terminates in a counterweight arm 32, which carries, preferably in a socket formed by the annular rib or flange 33, the counterweight block 34, formed preferably of cast steel to give the necessary weight.

The semaphore frame or web 29 is mounted upon and rocks with a rock shaft 35 journaled in bearings in the front and rear sides of the upper part of the casing as at 36, 37. The hub 38 of this frame is preferably connected to the shaft by driving through the hub and shaft a key or pin 39 having its ends split, the split ends being then expanded to hold the parts in place. This construction does away with the bolt and nut connection or similar connections which are easily disarranged and jarred loose, it being understood in connection with this and other features of the present invention that the element of certainty of connection and the proper coöperation of various parts is of vital importance in dealing with inventions in this art. For the same reason I have provided a number of hollow bosses 40 in connection with the counterweight arm 32, which bosses project through holes in the counterweight block 34, the block being held in place by expanding or upsetting the projecting ends of the bosses as shown in Fig. 7, the semaphore frame being preferably formed of malleable iron or a similar material, which will permit such manipulation, thereby doing away with a screw or bolt connection.

I add to the effectiveness of the counterweight without adding to the dead weight thereof, which is a disadvantage in handling and in normal operation, by grooving the outer surface of the counterweight block 34, as best shown in Figs. 1 and 6, and by providing ribs 41 on the outer face of the counterweight arm proper. These grooves and ribs form pockets which will catch and hold snow and sleet in the winter, and being loaded thereby will counterbalance the added weight of the semaphore blade caused by the snow and ice adhering thereto, which might otherwise tend to disarrange the balance of parts and interfere with the proper movement of the signal. On the counterweight arm and at one side of the hub 38 there is struck up a lug or boss 42, adapted for the connection of an actuating rod when the semaphore is to be used with outside actuating connections, as will be hereinafter described.

Mounted upon the projected end of the shaft 35 outside the hub of the semaphore is a collar 43 which is connected to the shaft by a similar split pin 44 and which carries a spectacle frame 45 within which is set a ruby roundel 46. Thus it will be seen that the spectacle frame and the semaphore proper, while they are carried by the same shaft and move together, are independent parts and may be packed and shipped as such. The casing 28 may terminate in a cap or ornament 47, either integral therewith or connected thereon as shown.

Turning now to the means for rocking the shaft 35 to obtain the desired movement of the semaphore, an actuating rod 50 extends up through the hollow post and is connected at its upper end, preferably by means of a clevis or connecting piece 51, to the end of a curved lever 52 carried by a collar 53 pinned to the semaphore shaft. In the preferable construction, as shown in Fig. 7, the end of the lever 52 is forked and a pin 54 passes through the forked arm and the clevis 51, the necessary pivotal motion being allowed for by the loose fit of the clevis to the pin, or otherwise as desired. The actuating rod 50 extends through the post to a point within the base 20, where, as best shown in Figs. 4 and 5, it is connected by means of a similar clevis 51, which is the same in construction as the clevis at the upper end but reversed as to position, to one of the arms of a bell crank lever 55 loosely pivoted upon a shaft or pivot rod 56 supported in suitable bearings in the walls of the casing, as at 57, 58. The bell crank lever 55 is held to a proper position intermediate the ends of the shaft by means of washers 59, 59 held by pins 60, 60 passing into the shaft and the shaft is similarly held to position in its bearings by means of washers 59, 59 restrained from movement by pins adjacent their inner faces, as shown. It will be seen that through the described connections when the bell crank lever 55 is rocked upon its axis, as by throwing the long arm shown in Fig. 4 to the right, the lever 52 connected to the semaphore shaft will be thrown up and the shaft rocked, thus pushing the semaphore down, this pushing motion, wherein the actuating rod moves in one direction and pushes the semaphore blade in the other direction, being desirable in this connection. It will be seen that upon breaking of any of the connections or faulty operation thereof, the semaphore will at once swing to danger and remain there until the fault is remedied. The bell crank lever 55 may be swung in any desired way. As indicated in Fig. 1, it is actuated through a second bell crank lever 55 of similar construction to the first bell crank lever so that it may be interchangeable therewith, the two bell crank levers being connected by a wire 61 extending through a hole in the side of the base 20, as at 62, and through the wall of the operating station indicated at A so that the outer bell crank lever may be located beneath the operator's desk in a position to be actuated by the foot of the operator, leaving his hands clear. This is desirable at certain stations where operators are required to send or receive messages at a time when a signal is to be held down for an approaching train and in order that there may be no temptation for violation of the very important operator's rule "not to fasten a signal down".

In order that the interior of the base casing 20 may be readily accessible for the purpose of positioning, removing or re-positioning the parts inclosed therein, an opening is provided closed by a door 63 mounted to swing upon a pivot, as at 64, and adapted to be locked in any desired way.

An important feature of this invention relates to the character and positioning of the illuminating means for the night signal which is shown as an oil pot 65 carrying a wick 66 and located within the casing in proper position with relation to lenses or transparent media located in and carried by the walls of the casing. As shown in Fig. 7 and in the details of Figs. 8 and 9, one wall of the casing carries a lens 67 which is supported in a bracket or frame 68 having an annular outturned lip, this frame being either integral with or suitably connected to the casing. This lens is shown as a focusing lens and it is desirable that the flame should be placed at the proper distance from the inner face of the lens in order to obtain the best results with a minimum size of flame and a consequent minimum consumption of oil and size of oil pot. This relation is shown in Fig. 8 and is made possible by the fact that the lens is carried independently of the oil pot instead of being connected thereto as in the usual construction of signal lights. As shown in Fig. 9, a similar bracket or frame 68 in the rear of the casing or on the side opposite the semaphore is provided with a plain roundel 69, the brackets being of the same size in order to allow for readily replacing the roundel with a focusing lens for a double-blade signal, as will be hereinafter more readily described. The oil pot 65 is held in proper position in the upper casing 28 by a counterweight 70, shown in Fig. 4, connected to a cord or wire 71 which passes over a pulley 72 loosely mounted upon the semaphore shaft 35 and held in position thereon by the liner 73. This cord opens out at its end into strands connected to ears 74 on the oil pot.

The sides of the oil pot are hollowed out or cut away, as shown in the plan view of Fig. 7, in order to allow for the movement of the actuating rod 50 and the counterweight 70 between the sides of the oil pot and the inner wall of the hollow post. The oil pot may be drawn down to the door 63 for inspection or cleaning by a cord 75 attached to its lower side, as at 76, the counterweight then rising to a corresponding distance. This aids in attaining one of the general aims of the invention, which is to provide a mounting for a semaphore which does away with the necessity for the use of a ladder for climbing the post either integral therewith or separate therefrom, by the use of which the signal might be tampered with, since the lamp may be drawn down to the base of the machine where it may be readily attended to without necessitating the presence of an able-bodied or adult attendant.

As looking toward the same end, there is provided in connection with the lamp counterweight 70 a lubricating device for lubricating the semaphore shaft such that it will not be necessary to pay any attention to the lubrication of such shaft beyond the filling of a lubricating cup 77 carried at the top of the counterweight, which is for the greater part of the time at the lower part of the post where it is readily accessible for this purpose. Extending from this oil cup and preferably wound around the counterweight cord at its lower end is a wick 78, best shown in Figs. 10 and 11. When the lamp is lowered the counterweight will be raised to the position shown in Fig. 10 and the wick will then wrap partially around the pulley 72, squeezing out the oil held thereby through ducts 79 in the pulley and onto the surface of the shaft 35 which is preferably provided, as indicated at 80, Fig. 6, with a groove for feeding the lubricant to different areas thereof.

When the signal is used with a single semaphore blade as in the arrangement of parts thus far described, it is desirable that a back light should be provided, or a signal which will be set with the danger signal and which may warn an engineer upon looking back if he has inadvertently run past a danger signal in the night. This invention proposes the use of a back light frame, as at 81, Figs. 6, 12 and 13, within which may be inserted a small section of blue glass 82, which frame is carried by an arm 83 projected from a clip 84 secured to and moving with the connecting rod 50. Thus, whenever the actuating rod 50 is in its lower position with the semaphore at danger as in the position Fig. 6, the blue roundel will register with the flame and the roundel 69. Thus I provide a back light which is inclosed in the casing which may be of very simple and cheap construction, and which is connected to and moves with the actuating means for the semaphore rather than with the semaphore itself, thereby increasing the efficiency and certainty of its operation.

The importance of certain features of this invention in the line of ready interchangeability of parts and because of the ease with which the parts may be arranged for different classes of signals, thereby obviating the necessity of manufacturing or keeping on hand a stock of semaphores of different construction for right and left signals, double-blade signals, etc., will now be apparent upon considering the parts as arranged for various classes of signals. In Fig. 1 as already described is shown a single-blade signal adapted to be operated directly from the side or from a point in line with the blade.

Figs. 14, 15 and 16 show an arrangement when it is desired to use a double-blade signal with inclosed actuating rods. In this case, as shown in Fig. 14, a second shaft 35 is journaled in bearings in the casing, as at 86, 87 and the end of this shaft projecting on the opposite side of the casing from the other shaft carries a semaphore and spectacle similar to those already described. In this case the back-light is necessarily omitted and the roundel 69 shown in Fig. 9 is replaced by a focusing lens 67 adapted to coöperate with the flame and the ruby of the second spectacle for a clear or danger signal. The only other change involved is placing upon shaft 56, as shown in Fig. 15, a bell-crank lever 55 of exactly the same construction as the first bell crank except that it is reversed as to the position of the long and short arms and connecting said bell crank lever to rock the second semaphore shaft 35 through connections similar to those at the other side. The pivot shaft 56 in the base is provided, as shown, with a series of pin holes in order to allow washers to be held at the proper place for positioning the second bell crank lever. One or both of the bell crank levers 55 may be actuated by connections to bell cranks acting as treadle levers, as already described in connection with Fig. 1, or in any other desired way. In order that both shafts 35 may be properly lubricated in the double-blade construction, there may be provided a felt washer as 91, Fig. 14, located upon the shaft 35 which carries the lamp pulley 72, said washer being adapted to bear against the companion shaft 35, thereby transferring the lubricant from one shaft to the other.

If it is desired, as shown in Fig. 17, for any reason to position the outer bell crank levers 55, 55 at a distance above the floor of the operating station, in which position they may be actuated by depending handles or cords 90, 90, it is then desirable to locate the actuating rods 50, 50 on the outside of the post in order that the connections therefrom to the bell crank levers may not interfere with the movement of the oil pot down through the post to the base. Such construction is advantageous both on this account and at times because of other conditions. As shown in Fig. 17, the illustration is of a double-blade signal although not necessarily limited thereto. In this construction the clevises 51, 51 attached to the connecting rods 50, 50 are pivotally secured upon the bosses 42 heretofore referred to as located upon the semaphore frames, and the curved levers 53 may be dispensed with. Upon the studs 25, 26 located upon opposite sides of the center coupling 23 and which may be permanently secured thereto or adapted to be removed therefrom when not in use if desired, are located bell crank levers 55, 55 of similar construction as those already referred to, having their long arms connected by clevises 51, 51 to the connecting rods 50, 50 and their short arms connected as by wires 92, 92 to the outer bell crank levers to which the handles 90, 90 are attached.

The perspective view of Fig. 20 shows conditions under which it may be desired to operate a semaphore located at the right or left of the operating station, and this view, taken in connection with the view of Fig. 19, illustrates the adaption of the semaphore of this invention for such purpose. The base or casing 20 in addition to the shaft or pivot rod bearings or housings already described is provided with two sets of bearings 93, 94 and 95, 96 adapted to support the shaft at opposite sides of the casing. The view shown in full lines in Fig. 19 corresponds to the position of the pivot shaft when the semaphore is to be used as single blade left, that is a single blade semaphore at the left of the operating station.

It will be seen by comparison of Figs. 15 and 19 that in order to change from the ordinary single blade signal or the double blade signal, it is only necessary to change the pivot shaft 56 so that it rests in the bearings 93, 94 and then move the bell crank lever 55 to a proper position thereon, which position may be if desired indicated by markings in connection with the pin holes for holding the restraining washers. If it is desired, on the other hand, to use the semaphore for a single-blade right signal, the shaft will be changed to the bearings 95, 96 as shown in dotted lines in Fig. 19 and the bell crank lever properly positioned accordingly, the semaphore and semaphore shaft being correspondingly located. In order to provide for the necessary play of the arms of the bell crank levers, as at 97, 98 in Fig. 19 when the shafts are located as shown close to the side walls of the casing, and in order to provide a compact casing allowing for proper positioning of all parts without unduly increasing the size thereof, I bulge or extend the sides of the casing as 99, 100, in order that the arms of the bell crank levers may move therewith in operation.

As shown in the perspective of Fig. 20, the station is indicated at A, with a double track B in front. One of the semaphore signals, indicated generally by C, is adapted to be operated by the wire D connected to a bell crank lever E within the station. A similar semaphore F at the other end is operated by a wire H connected to the bell crank K. From the description already given, it will be seen that a signal construction in accordance with my invention may be used at either of these two points with very slight changes in the operating mechanism.

It will thus be apparent that I have provided a semaphore signal in the construction of which a minimum number of parts is necessary, as a large number of the parts are interchangeable, thus decreasing also the number of parts which must be carried in stock, while at the same time I provide a signal which is adapted for a variety of uses for filling which it has been before necessary to supply a number of differently constructed devices.

Specific advantages of the invention in the line of inclosing and protecting the operating mechanism and the lamp, in providing a light, easily regulated and actuated semaphore arm, in the possibility of obtaining the maximum illumination by proper focusing without necessitating the use of a very large lamp, in the positioning of the lamp beneath the semaphore shaft so that the heat of the lamp may prevent the shaft from freezing, and in various other details, will be apparent to those skilled in the art without the necessity of further elaboration.

Furthermore, the fact, which is especially applicable to inventions of this character, will be clear to those acquainted with the art, that various changes may be made in the form of individual elements and in the relation of the elements to each other, which might materially change the appearance of certain part or parts without altering the essential ideas thereof and without departing from the scope of this invention.

Having described my invention, what I claim as new and desire to secure by Letters Patent is:—

1. In a semaphore signal, in combination, a hollow support or post, a shaft mounted in bearings at the upper end of said post, a semaphore blade mounted upon said shaft on the outside of said post, a bell crank lever mounted for pivotal movement within the lower end of said post, connections between the bell crank lever and said shaft whereby said semaphore blade may be set at different positions by swinging said bell crank lever, and connections whereby said bell crank lever may be swung upon its pivot by power applied outside of said post.

2. In a semaphore signal, in combination, a hollow support or post, a shaft mounted in bearings at the upper end of said post, a semaphore blade mounted upon said shaft at the upper end of said post, an arm connected to said shaft within the post and moving therewith, a rod extending down through the post, a clevis connecting said rod and arm such that the shaft will be rocked upon the reciprocation of the rod, a bell crank lever mounted for pivotal movement within the lower end of the post, a clevis of similar construction connecting one of the arms of said bell crank to said connecting rod, and means for rocking said bell crank upon a pivot.

3. In a semaphore signal, in combination, a semaphore blade, a hollow support or post upon which said blade is mounted for swinging movement relative thereto, said post comprising a main length of spirally riveted pipe, an upper casing upon which said blade is immediately supported and a lower or base casing, actuating mechanism inclosed in said post and adapted to set said blade at different positions, and means for controlling said actuating mechanism located in the base casing.

4. In a semaphore signal, in combination, a semaphore blade, a casing on the outside of which said blade is supported for movement with relation thereto, a plurality of sections of spirally riveted pipe on the upper section of which said casing is supported, a coupling between two of said sections, said coupling being provided with a hand hole for access to the interior thereof, a casing supporting the lower of said pipe sections, a mechanism for controlling the position of said blade inclosed by said casing and pipe sections, and means for supplying power to said controlling mechanism from a point without said casing.

5. A post for supporting a semaphore blade, said post being built up of sections of spirally riveted pipe, a coupling between two adjacent pipe sections adapted to be riveted thereto, and a hand hole in said coupling for permitting access to the interior thereof.

6. In a semaphore signal, in combination, a hollow support or post, a shaft mounted in bearings on the upper end of said post, a semaphore blade mounted upon said shaft on the outside of said post, a pulley mounted loosely upon said shaft within said post, a cord passing over said pulley, a lamp connected to one end of said cord and a counterweight to the other, and a lubricating device carried by said counterweight and adapted to lubricate said shaft when the counterweight is in its uppermost position.

7. In a semaphore signal, in combination, a hollow support or post, a shaft mounted in bearings on the upper end of said post, a semaphore blade mounted on said shaft on the outside of said post, a pulley mounted loosely upon said shaft, a cord passing over said pulley, a lamp connected to one end of said cord and a counterweight to the other, ducts leading from the periphery of said pulley to the shaft, an oil cup carried by said counterweight, a wick located in said oil cup and adapted to transfer lubricant to said shaft through the ducts in the pulley when the counterweight is at the upper end of the post.

8. In a semaphore signal, in combination, a hollow support or post, a semaphore blade mounted thereon for movement relative thereto, means for actuating said blade located within said post, a light supplying means also located within said post and a back-light connected to said actuating means and adapted to move therewith to and from registry with said light supplying means.

9. In a semaphore signal, in combination, a hollow support or post, a shaft mounted in bearings therein, a semaphore blade mounted upon said shaft for movement therewith, a reciprocable rod located within said post, connections from said rod to said shaft for rotating said shaft, a light supplying means located within said post, a back-light frame adapted to be moved to or from a position in registry with said light supplying means, and connections between said frame and said reciprocable rod whereby said frame moves with said rod.

10. In a semaphore signal in combination, a hollow support or post, a semaphore blade mounted upon the outside of said post for movement relative thereto, actuating mechanism within said post for so moving said blade, a light supplying means, and a back-light frame connected to said actuating means and adapted to be moved thereby to a position in and out of registry with said light supplying means.

11. In a semaphore signal, in combination, a hollow support or post, a semaphore blade mounted upon said post for movement relative thereto, an actuating rod within said post adapted to be reciprocated for so moving said blade, a light supplying means and a back-light frame connected to said actuating rod and moving therewith.

12. In a semaphore signal, a semaphore arm carrying a semaphore blade at one end thereof and a counterweight at the other end thereof, the counterweight end of the arm being provided with open pockets or receptacles adapted to be exposed to and receive natural accumulations.

13. In a semaphore signal, a semaphore arm carrying a blade at one end thereof and a counterweight at the other end, one of the faces of the counterweight end of the arm being roughened or corrugated to provide open pockets or receptacles adapted to be exposed to and receive natural accumulations.

14. In a semaphore signal, a frame adapted to carry a blade at one end thereof, a socket in the other end of said frame and a counterweight block secured in said socket.

15. In a semaphore signal, a frame adapted to carry a blade at one end thereof, said frame being formed of material the shape of which can be changed by pressure, as malleable iron, a boss on the counterweight end of said frame and a counterweight block adapted to be secured to said boss and fastened thereto by expanding the projecting end of said boss against the outer face of said counterweight block.

16. In a semaphore signal, in combination, a support or post, said support or post being provided with a plurality of bearings for blade carrying shafts located substantially at the same elevation and with a plurality of bearings for shafts adapted to support actuating devices for said blade carrying shafts.

17. In a semaphore signal, a support or post provided with similar bearings for a plurality of blade carrying shafts and bearings for a plurality of actuating devices corresponding to the blade carrying shafts said shafts being interchangeable within said first bearings whereby said blade may be extended to either side of said support.

18. In a semaphore signal, in combination, a hollow support or post, similar bearings for a plurality of blade carrying shafts carried by said post, bearings for a plurality of actuating devices also carried by said post, and actuating connections inclosed within said post said shafts being interchangeable within said first bearings whereby said blade may be extended to either side of said support.

19. In a semaphore signal, in combination, a hollow post or support, a casing at the upper end of said post, said casing being provided with bearings for a plurality of blade carrying shafts, and a casing at the lower end of said post, said casing being provided with a plurality of bearings for a support for the actuating devices.

20. In a semaphore signal, in combination, a support or post made up of sections of tubular or hollow material, a casing at the upper end of said post provided with bearings for a plurality of blade carrying shafts, a casing at the lower end of said post provided with a plurality of sets of bearings for a shaft for supporting actuating devices for the blade carrying shafts and a coupling connecting two of the post sections, said coupling being provided with means for supporting actuating devices corresponding to the upper shaft bearings.

21. In a semaphore signal, in combination, a support or post made up of sections of tubular or hollow material, a casing at the upper end of said post provided with bearings for a plurality of blade carrying shafts, a casing at the lower end of said post provided with a plurality of sets of bearings corresponding to the upper bearings and adapted for supporting actuating devices, and a coupling connecting two of the post sections, said coupling being provided on the outside thereof with means for supporting actuating devices corresponding to the upper shaft bearings.

22. In a semaphore signal, in combination, a hollow support or post, a casing carried thereby provided with bearings for a plurality of blade carrying shafts, a second casing carried by said post provided with a plurality of sets of bearings, a shaft adapted to be supported in any of said sets of bearings, and an actuating device carried by said shaft and adapted to be moved therealong.

23. In a semaphore signal, in combination, a support or post provided with bearings for a plurality of blade carrying shafts, said post being provided with a plurality of sets of bearings adapted to support a pivot shaft in positions corresponding to the various blade shaft bearings, and a bell crank lever adapted to be moved along said pivot shaft and held in various positions thereon.

24. A casing adapted to be included as part of a semaphore post, said casing being provided with a plurality of sets of bearings for supporting the actuating mechanism in different positions.

25. A casing adapted to be included as part of a semaphore post, said casing being provided with a plurality of sets of bearings, a pivot shaft adapted to be supported in any of said sets of bearings, and a bell crank lever carried by said pivot shaft and adapted to be moved therealong.

26. A casing adapted to be included as part of a semaphore post, said casing being provided with a plurality of sets of bearings, a pivot shaft adapted to be supported in any of said sets of bearings, and a bell crank lever carried by said pivot shaft and adapted to be moved therealong, the sides of said casing being extended at a certain point or points to permit movement of the arms of said bell crank lever.

27. A casing adapted to be included as part of a semaphore post, said casing being provided with a set of bearings for supporting a shaft in a position substantially central thereof and sets of bearings for supporting a shaft adjacent either of the side walls thereof.

28. A casing adapted to be included as a part of a semaphore post, said casing being provided with a plurality of sets of bearings, a shaft adapted to be supported in said bearings in various positions within said casings, and an actuating device mounted upon said shaft.

29. A casing adapted to be included as a part of a semaphore post, said casing being provided with a plurality of sets of bearings, a shaft adapted to be supported in said bearings in various positions within said casing, and an actuating device adjustably mounted upon said shaft.

30. A casing adapted to be included as a part of a semaphore post, said casing being provided with a plurality of sets of bearings, a shaft adapted to be supported in said bearings in various positions within said casing, and a bell crank lever mounted upon said shaft.

31. A casing adapted to be included as a part of a semaphore post, said casing being provided with a plurality of sets of bearings, a shaft adapted to be supported in said bearings in various positions within said casing, and a bell crank lever adjustably mounted upon said shaft.

32. In combination, a signal post, a signal lamp, means adapted to permit the moving of said lamp from one portion of said post to another, and means adapted to lubricate said means upon said movement taking place.

33. In combination, a signal post, a signal lamp within said post, means adapted to permit the moving of said lamp from one portion of said post to another, and means adapted to lubricate said means upon such movement taking place.

34. In combination, a signal post, moving parts mounted upon said post, and lubricating means adapted to be placed in operative condition upon the movement of said moving parts.

35. In combination, a signal post, moving parts mounted within said post, and lubricating means adapted to be placed in operative condition upon the movement of said moving parts.

36. In combination, a signal element, lubricating means, and means whereby the same are alternately placed in operative position.

37. In combination, lubricating means, signaling mechanism adapted to be lubricated thereby, and means whereby said signaling mechanism and said lubricating means are alternately placed in operative position.

38. In a signaling system, means adapted to counter balance natural accumulations upon the moving parts.

39. In a signaling system, means adapted to neutralize the effect of natural accumulations upon the moving parts.

40. In a signaling system, means adapted to equalize the distribution of the weight of natural accumulations upon the moving parts.

41. In a signaling system, means adapted to distribute natural accumulations upon the moving parts so as to neutralize the effect of the same.

42. In a signaling system, means adapted to distribute natural accumulations upon the moving parts so as to balance the weight of the same.

43. In combination, a signal post having a threaded base, a semaphore rotatably supported upon said post, and a supporting member for said post adapted to engage the threaded portion of said base said supporting member being free to turn upon said base.

44. In combination, a signal post, a semaphore rotatably mounted thereon, and a supporting member for said post, the parts being so connected as to permit relative rotary movement between said post and said supporting member and the turning of said semaphore in any desired direction.

45. In combination, a signal post and a supporting member for the same, a semaphore rotatably supported upon said post, the parts being so connected as to permit a relative rotary movement of said post about a vertical axis.

46. In combination, a signal post, a supporting member for the same, the parts being so connected as to permit a relative rotary movement, and means upon said signal post adapted to counter-balance natural accumulations upon the parts thereof.

47. In a semaphore signal, a signal post and semaphore rotatably mounted thereon, actuating mechanism carried by said post, and a supporting member for said post, said post and said supporting member being so connected as to permit relative rotary movement of the post with respect to the supporting member, whereby said semaphore may be turned in any desired direction.

48. In a semaphore signal, in combination, a casing, a shaft journaled therein and having one end projecting therefrom, a semaphore arm supported upon said projecting end, and a spectacle frame mounted upon said projecting end independently of said semaphore arm.

In testimony whereof I affix my signature, in the presence of two witnesses.

SAMUEL H. HARRINGTON.

Witnesses:
J. B. KNOX,
L. B. STREVELL.